United States Patent
Lackey, Jr. et al.

(10) Patent No.: US 10,749,756 B2
(45) Date of Patent: Aug. 18, 2020

(54) CHANNEL TRAINING USING A REPLICA LANE

(71) Applicants: Advanced Micro Devices, Inc., Sunnyvale, CA (US); ATI Technologies ULC, Markham (CA)

(72) Inventors: Stanley Ames Lackey, Jr., Leominster, MA (US); Damon Tohidi, Richmond Hill (CA); Gerald R. Talbot, Concord, MA (US); Edoardo Prete, Arlington, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 61 days.

(21) Appl. No.: 15/192,287

(22) Filed: Jun. 24, 2016

(65) Prior Publication Data
US 2017/0373944 A1 Dec. 28, 2017

(51) Int. Cl.
*H04L 12/24* (2006.01)
*H04L 12/26* (2006.01)
*H04L 7/10* (2006.01)
*H04L 25/14* (2006.01)
*H04L 7/06* (2006.01)
(Continued)

(52) U.S. Cl.
CPC .............. *H04L 41/147* (2013.01); *H04L 7/06* (2013.01); *H04L 7/10* (2013.01); *H04L 25/14* (2013.01); *H04L 43/0823* (2013.01); *H04L 43/0852* (2013.01); *H04L 43/50* (2013.01); *H04L 7/0041* (2013.01); *H04L 7/043* (2013.01)

(58) Field of Classification Search
CPC .............................. H04L 41/147; H04L 7/06
See application file for complete search history.

(56) References Cited

U.S. PATENT DOCUMENTS 7,467,056 B2 * 12/2008 Maniloff ............ H03K 19/1731
375/219
7,500,131 B2 3/2009 Panikkar et al.
(Continued)

FOREIGN PATENT DOCUMENTS

JP 2014206971 A 10/2014

OTHER PUBLICATIONS

European Search Report in European Application No. 16200968.2, dated May 22, 2017, 4 pages.
(Continued)

*Primary Examiner* — Jeffrey M Rutkowski
*Assistant Examiner* — Chae S Lee
(74) *Attorney, Agent, or Firm* — Kowert Hood Munyon Rankin and Goetzel PC; Rory D. Rankin

(57) ABSTRACT

Systems, apparatuses, and methods for utilizing training sequences on a replica lane are described. A transmitter is coupled to a receiver via a communication channel with a plurality of lanes. One of the lanes is a replica lane used for tracking the drift in the optimal sampling point due to temperature variations, power supply variations, or other factors. While data is sent on the data lanes, test patterns are sent on the replica lane to determine if the optimal sampling point for the replica lane has drifted since a previous test. If the optimal sampling point has drifted for the replica lane, adjustments are made to the sampling point of the replica lane and to the sampling points of the data lanes.

18 Claims, 7 Drawing Sheets

(51) Int. Cl.
*H04L 7/00* (2006.01)
*H04L 7/04* (2006.01)

(56) References Cited

U.S. PATENT DOCUMENTS

| | | | |
|---|---|---|---|
| 8,307,265 | B2 | 11/2012 | Ganga et al. |
| 8,760,946 | B2 | 6/2014 | Dearth et al. |
| 9,030,341 | B2 | 5/2015 | Tan et al. |
| 9,036,757 | B1 | 5/2015 | Su et al. |
| 2003/0046618 | A1* | 3/2003 | Collins .................. H04L 25/14 714/700 |
| 2005/0041683 | A1 | 2/2005 | Kizer |
| 2008/0130815 | A1* | 6/2008 | Kumar ..................... H03C 5/00 375/373 |
| 2008/0222594 | A1* | 9/2008 | Maniloff ............ H03K 19/1731 716/128 |
| 2009/0150586 | A1* | 6/2009 | Rashid ............... G06F 13/4081 710/107 |
| 2011/0040902 | A1 | 2/2011 | Housty |
| 2012/0106687 | A1 | 5/2012 | Bulzacchelli et al. |
| 2012/0151247 | A1* | 6/2012 | Ferraiolo .................. H04L 1/22 714/4.5 |
| 2012/0314721 | A1* | 12/2012 | Bulzacchelli ............. H04L 7/10 370/503 |
| 2014/0281085 | A1 | 9/2014 | Ebert |
| 2017/0187498 | A1* | 6/2017 | Chandrasekaran ..... H04L 1/205 |

OTHER PUBLICATIONS

Communication pursuant to Article 94(3) EPC in European Application No. 16200968.2, dated Jun. 2, 2017, 6 pages.
Lackey, et al., U.S. Appl. No. 15/191,322, entitled "Asynchronous Feedback Training", filed Jun. 23, 2016, 32 pages.
Communication pursuant to Article 94(3) EPC in European Application No. 16200968.2, dated Jan. 3, 2018, 4 pages.
International Search Report and Written Opinion in International Application No. PCT/US2016/052725, dated Mar. 20, 2017, 12 pages.
Non-Final Office Action in Japanese Application No. 2018-556345, dated Oct. 1, 2019, 7 pages.

* cited by examiner

CHANNEL TRAINING USING A REPLICA LANE

BACKGROUND

Technical Field

Embodiments described herein relate to data communication and more particularly, to performing training of bit-serial data links.

Description of the Related Art

The data throughput of integrated circuits continues to increase as applications' demand and consumption of data increases. For example, the rate of improvement in microprocessor speed continues to exceed the rate of improvement in memory speed. Increasing the rate at which data is transmitted increases the timing requirements of the circuitry used to transmit and receive the data. In many circuits utilized in computing devices and computing systems, data is transferred within these circuits using a global clock. For example, the rising edge of the clock may load the data coming in to a flip-flop, and then the data can be passed on or processed from the flip-flop. In some scenarios, a single clock is used in a data bus of multiple data lanes, with each data lane carrying a separate serial bitstream. However, this limits the speed of the data bus because the transition of the clock has to be used for the whole data bus, but some bits of data may take longer to get down the bus relative to other bits of data. If the variation between data lanes is too high, then a location for placing the clock edge to correctly clock in the whole data bus may not exist. Additionally, temperature or voltage variations may cause a phase alignment of a lane to drift over time. Correcting for such variations can cause a disruption in the flow of data, interrupting important operations and delaying the transfer of data.

SUMMARY

Systems, apparatuses, and methods for performing training of a bit-serial data link are contemplated.

In one embodiment, a training sequence is implemented to test delay settings between a transmitter and a receiver. The transmitter is coupled to the receiver via a communication channel of multiple data lanes. In one embodiment, the communication channel includes an extra replica lane. This extra replica lane may also be referred to as a periodic tracking (PT) lane. In various embodiments, the replica lane does not carry system data. Rather, the replica lane is configured for the transmission of test data only. The transmitter periodically executes a series of training sequences on the replica lane while the data lanes are carrying normal system data. The training sequences are performed in order to detect small timing changes on the replica lane due to temperature variations, power supply variations, and/or other factors. When a change is detected in the phase timing of the replica lane, control logic updates the phase timing in the replica lane and in the regular data lanes.

In one embodiment, the transmitter sends a test pattern on the replica lane while simultaneously sending first data on at least a second lane of the channel. If the receiver detects one or more errors in the received test pattern on the replica lane, the transmitter and/or receiver determines that a sampling point is misaligned on the replica lane. In response to determining that the sampling point is misaligned on the replica lane, the transmitter and/or receiver performs a first adjustment to the sampling point of the first lane and performs the first adjustment to a sampling point of the second lane. The first adjustment to the sampling point of the second lane is equivalent to the first adjustment to the sampling point of the replica lane. After making the first adjustment to the sampling point of the second lane, the transmitter is configured to send second data on the second lane.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
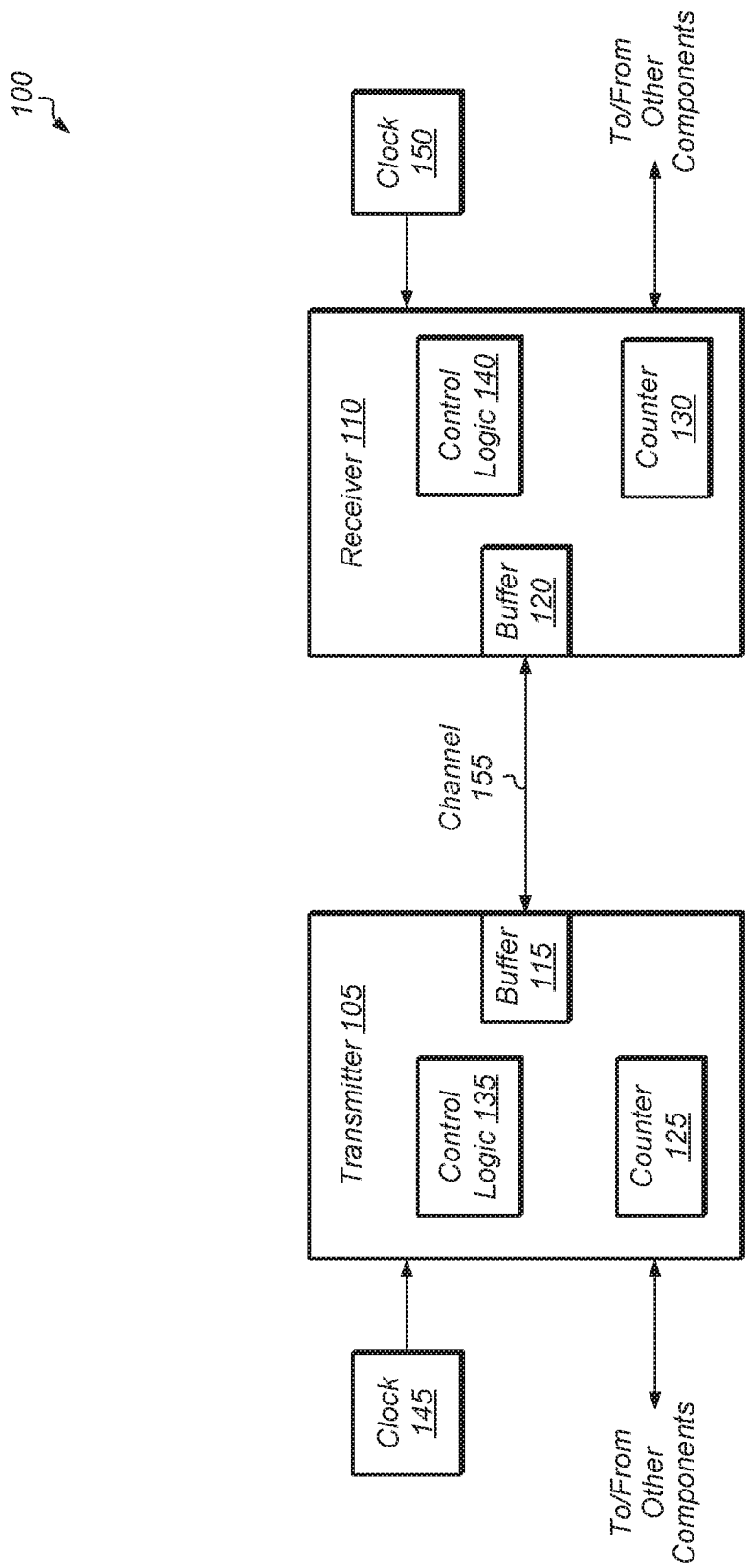
FIG. 1 is a block diagram of one embodiment of a transmitter and a receiver of a computing system.

Referring now to FIG. 1, a block diagram illustrating one embodiment of a transmitter 105 and a receiver 110 of a computing system 100 is shown. Transmitter 105 is coupled to receiver 110 via channel 155. Channel 155 includes any number of data lanes, depending on the embodiment. Channel 155 also includes a replica lane, a clock lane, and/or one or more other lanes. Computing system 100 also includes clock 145, clock 150, and one or more other components not shown to avoid obscuring the figure. For example, computing system 100 includes one or more processing units (e.g., processor, processor core, programmable logic device, application specific integrated circuit), one or more memory devices, and/or other components. The one or more processing units are configured to execute instructions and/or perform one or more types of computations (e.g., floating point, integer, memory, I/O) depending on the embodiment. In various embodiments, the components of computing system 100 are interconnected by one or more communication buses. In one embodiment, transmitter 105 and receiver 110 are in the memory path of a processor. In various embodiments, the memory coupled to the processor is a double data rate synchronous dynamic random-access memory (DDR SDRAM). In other embodiments, the memory is implemented using other types of memory devices.

Transmitter 105 includes buffer 115 coupled to channel 155. In one embodiment, buffer 115 is a tri-state buffer for driving an output on channel 155 or creating a high impedance state when transmitter 105 is waiting to receive feedback from receiver 110 on the status of a training sequence. Transmitter 105 also includes control logic 135 for generating training sequences, controlling delay settings for the lanes of channel 155, and/or performing other functions. Transmitter 105 also includes counter 125 for counting supercycles. In various embodiments, a supercycle is 'N' clock cycles long, with 'N' being a positive integer. For example, in one embodiment, a supercycle is eight clock cycles long, while in other embodiments, the supercycle is other numbers of clock cycles. In one embodiment, clock 145 provides the clock signal for clocking counter 125.

Receiver 110 includes buffer 120 for connecting to channel 155. In one embodiment, buffer 120 is a tri-state buffer for driving a feedback result on channel 155 or creating a high impedance state when receiver 110 is receiving data from transmitter 105. Receiver 110 alsos include control logic 140 for detecting training sequence indications on channel 155, comparing received test patterns to expected values, controlling delay settings for the lanes of channel 155, and/or performing other functions. Receiver 110 also includes counter 130 for counting supercycles. In one embodiment, clock 150 provides the clock signal for clocking counter 130. In another embodiment, receiver 110 uses a clock signal received on channel 155 as the clock signal for clocking counter 130.

Transmitter 105 is configured to send test patterns over the replica lane and one or more data lanes of channel 155. The test patterns are utilized to determine the optimal sampling points of the replica lane and the data lane(s) of channel 155. The delay of the replica lane and the data lane(s) is adjusted based on the results of the test patterns and then normal data operation may begin. On a periodic basis, transmitter 105 is configured to send additional test patterns over the replica lane while the data lane(s) are carrying system data. If system 100 determines that the optimal sampling point for the replica lane has drifted since the previous test, then system 100 adjusts the sampling point of the replica lane so that it aligns with the optimal sampling point. System 100 also makes the equivalent adjustments to the sampling points of the data lane(s). In this way, a drift in the sampling point of the data lanes due to temperature variations, power supply variations, and/or other factors is corrected without interrupting the flow of system data.

Receiver 110 is configured to capture the test patterns sent by transmitter 105 on the replica lane and data lane(s). Receiver 110 then checks the captured test patterns for errors. In one embodiment, after sending the training pattern, transmitter 105 disables buffer 115 and waits for receiver 110 to send feedback regarding the captured test patterns. Receiver 110 enables buffer 120 and sends the feedback to transmitter 105 after determining if any errors were detected in the captured test patterns. Transmitter 105 captures the feedback and then uses the feedback (along with the feedback from other tests with other delay settings) to determine the data valid period (or "data eye") of the given data lane. After capturing the feedback, transmitter 105 determines whether to perform another test or to return to normal data operation. In another embodiment, receiver 110 makes adjustments to the delay settings of the replica lane and data lane(s) based on the number of detected errors in the captured test patterns.

System 100 is representative of any type of computing system or computing device which includes a transmitter 105 and a receiver 110. For example, in various embodiments, system 100 is a computer, a server, a compute node, a processor, a processing device, a programmable logic device, a memory device, a processing in memory (PIM) node, a mobile device, a television, an entertainment system or device, and/or other types of systems or devices. System 100 also includes any number of other transmitters and receivers in addition to transmitter 105 and receiver 110.

Figure 2:
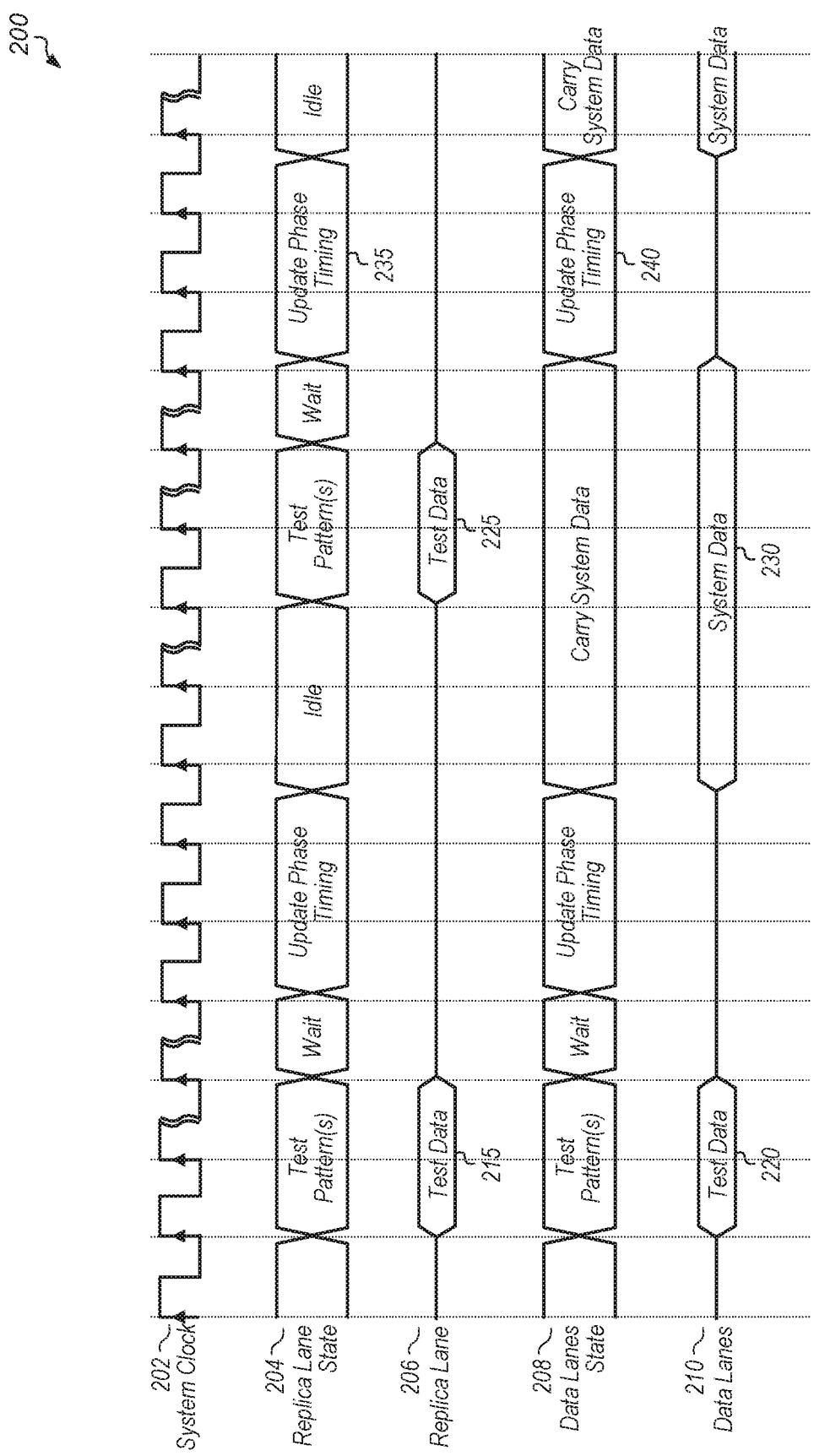
FIG. 2 is a timing diagram of one embodiment of performing a training sequence on a replica lane.

Turning now to FIG. 2, a timing diagram 200 of one embodiment of performing a training sequence on a replica lane is shown. The training sequence is implemented between a transmitter (e.g., transmitter 105 of FIG. 1) and a receiver (e.g., receiver 110 of FIG. 1) over a multi-lane channel (e.g., channel 155). The multi-lane channel includes a replica lane and a plurality of data lanes for carrying system data.

The cycles of the system clock 202 are shown in the top row of timing diagram 200. In one embodiment, the cycles shown in the clock 202 row of timing diagram 200 represent supercycles. A supercycle is 'N' system clocks, where 'N' is a positive integer greater than one and where 'N' is stored in a programmable register. In one embodiment, both the transmitter and the receiver include counters to count supercycles. In one embodiment, a supercycle is eight clock cycles in length, and the counters are modulo-8 counters. In other embodiments, the supercycle is other numbers of clock cycles. Replica lane state 204 shows the state of the replica lane of the channel during the clock cycles shown in timing diagram 200. Replica lane 206 shows the data being sent on the replica lane. Similarly, data lanes state 208 illustrates the state of the data lanes and data lanes 210 shows the data being sent on the data lanes during the clock cycles shown in timing diagram 200.

During an initial testing phase, the transmitter sends test patterns to the receiver on the replica lane and the data lanes. This is shown as test data 215 on replica lane 206 and test data 220 on data lanes 210. In one embodiment, the test pattern is a pseudo-random binary sequence. Prior to sending the test pattern on the replica lane and the data lanes, the transmitter sends a training sequence indication to let the receiver know a test pattern will be sent. When the receiver receives the training sequence indication on a given lane, the receiver gets ready to receive the test pattern on the given lane. Test data 215 and test data 220 correspond to any number of tests which are performed with different delay settings.

The receiver receives the test patterns on the replica lane and data lanes and check whether there are any errors in the received test patterns. In one embodiment, the receiver sends feedback about the presence or absence of errors in the received test patterns to the transmitter. This occurs during the "wait" state of the replica and data lanes. The system uses the results of the test patterns to identify the data eye of each of the replica lane and the data lanes. Then, based on the results of the test data, the system updates the phase timing on the replica lane and each of the data lanes. Each lane is updated independently of the other lanes based on the results of the received test patterns on the lane. It is noted that if the results indicate a given lane is already configured for the optimal sampling point, then the delay settings of the given lane are not adjusted during an update phase timing period.

After the first update to the phase timing of the replica lane and the data lanes, the replica lane sits idle while the data lanes carry system data 230. After a certain period of time, the system tests the replica lane to see if the phase timing of the replica lane has drifted. The system continues to send system data 230 on the data lanes while test data 225 is simultaneously sent on the replica lane. Then, after test data 225 is sent, the system determines if an adjustment should be made to the phase timing of the replica lane. If the optimal sampling point has drifted since the previous test based on the results of the received test pattern(s) on the replica lane, then the system updates the phase timing on the replica lane, which is shown as update 235 in the replica lane state 204 row. The system also performs the same update 240 to the phase timing of the data lanes based on the assumption that any drift on the replica lane will occur on the data lanes as well. In various embodiments, updates to the timing of the data lanes are performed while data transmission is active on the data lanes (e.g., while transmitting system data 230). In other embodiments, the data lanes temporarily pause transmission of data while timing parameters are adjusted during an update phase (e.g., 240). Both approaches are contemplated. After the updates 235 and 240 to the phase timing of the replica lane and data lanes, respectively, the system returns to sending system data on the data lanes while the replica lane returns to an idle state. Going forward, the system continues to periodically test the replica lane and apply any changes to the replica lane and data lanes if the phase timing of the replica lane has drifted.

Figure 3:
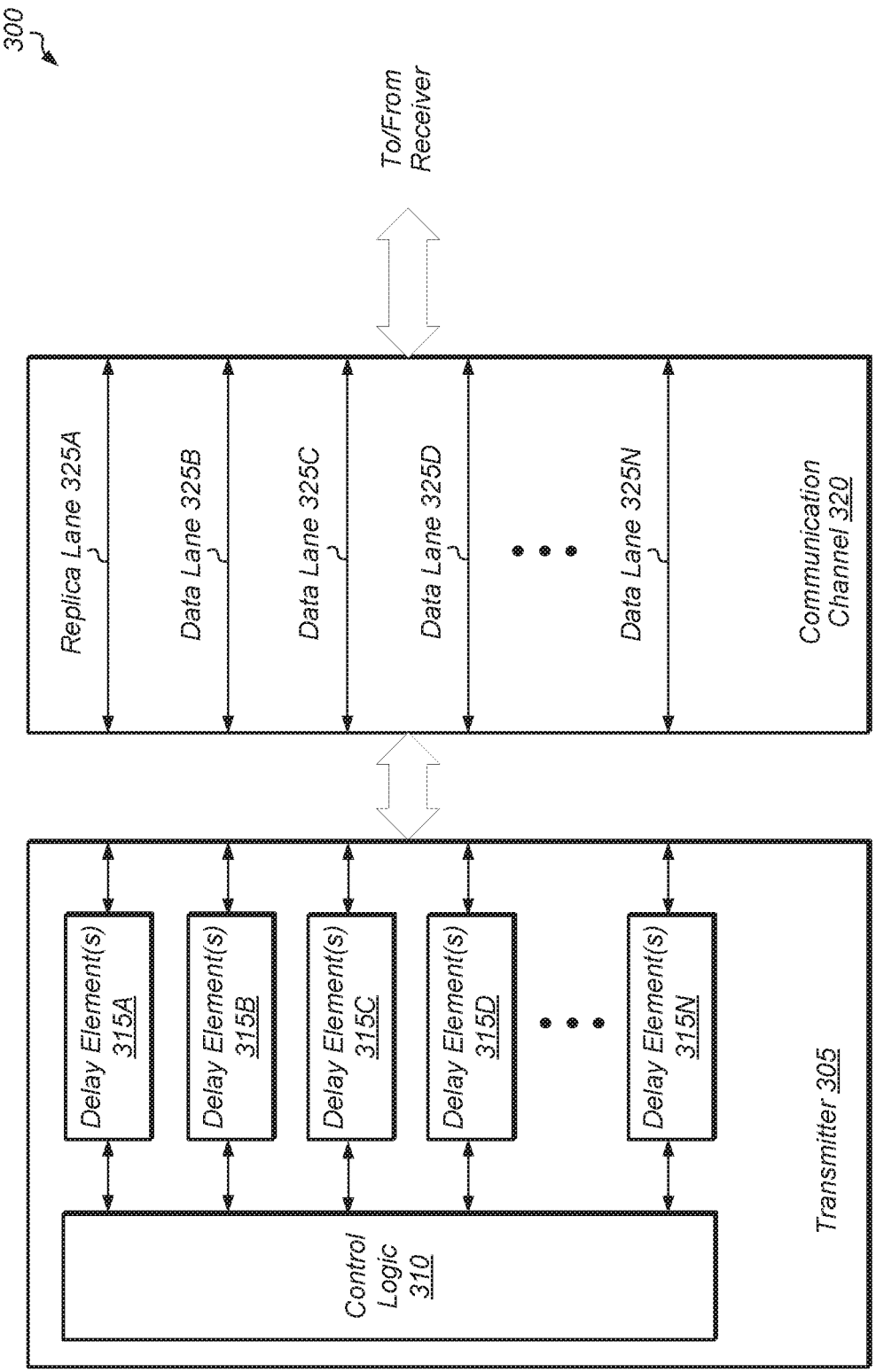
FIG. 3 is a block diagram of one embodiment of a system with a transmitter and a communication channel.

Referring now to FIG. 3, a block diagram of one embodiment of a system 300 with a transmitter 305 and a communication channel 320 is shown. Communication channel 320 is representative of any type of communication channel connecting a transmitter 305 and a receiver (not shown). Communication channel 320 includes a replica lane 325A and any number of data lanes 325B-N depending on the embodiment. Replica lane 325A is configured to carry test data to determine if the optimal sampling point has drifted since a previous test. In normal data operation, replica lane 325A is not utilized to carry system data but rather is idle. Each data lane 325B-N is configured to carry a serial bitstream of system data. Communication channel 320 also includes a clock lane (not shown) and/or one or more other lanes.

In one embodiment, transmitter 305 includes control logic 310 and delay elements 315A-N. Each individual set of delay element(s) 315A-N includes one or more delay elements to choose delay settings for a corresponding lane of lanes 325A-N. In one embodiment, the one or more delay elements include a coarse delay adjustment and a fine delay adjustment to be applied to a single lane of lanes 325A-N.

Transmitter 305 is configured to send test patterns on all of the lanes 325A-N to test delay settings on lanes 325A-N during an initial testing period. For example, this initial testing period occurs on start-up or after a reset. After transmitting the test patterns, the transmitter disables its output buffer (e.g. buffer 115 of FIG. 1). The output buffer is a tri-state buffer that is switched to a high impedance state by the transmitter 305 after the transmitter 305 has sent the test patterns to the receiver. After a period of time of preparing the feedback, the receiver activates its output buffer and sends the feedback to the transmitter. In one embodiment, the feedback indicates if there were any errors in the received test patterns. In one embodiment, the feedback is a single bit. In other embodiments, the feedback utilizes multiple bits to indicate the number of errors. The transmitter receives the feedback and utilizes the feedback to determine if the current delay settings were inside or outside of the data eye. After the transmitter receives the feedback, another test is performed or the transmitter goes into normal data operation In one embodiment, transmitter 305 transmits test patterns on each lane, and then the receiver (not shown) sends feedback to the transmitter 305 with a number of detected errors in each test pattern. Control logic 310 of transmitter 305 then utilizes this feedback to determine the data eye of each lane 325A-N. For example, the transmitter sends a plurality of test patterns with different delay settings for each lane 325A-N of channel 320. The feedback from the receiver for these test patterns is used by control logic 310 to determine the location of the data eye for each lane. Control logic 310 adjusts each of delay elements 315A-N to cause the sampling point on the receiver for the corresponding lane to correspond to the optimal sampling point based on the location of the data eye. Each of the adjustments to delay elements 315A-N is made independently of the adjustments to the other delay elements 315A-N.

Then, after the phase testing sequence has been performed on all lanes 325A-N, system 300 goes into normal data operation. During normal data operation, data lanes 325B-N are utilized to carry system data while replica lane 325A is idle. In other words, replica lane 325A is not used to carry system data. Then, during normal data operation, system 300 periodically utilizes replica lane 325A to perform phase testing to see if the phase timing has drifted since the previous test. Depending on the embodiment, phase timing on replica lane 325A drifts based on temperature variations, power supply variations, and/or factors. System 300 performs the phase testing on replica lane 325A while the data lanes 325B-N are carrying system data. In this way, system 300 is able to test the phase timing of replica lane 325A without interrupting the flow of system data on data lanes 325B-N.

If system 300 detects a drift in the phase timing on replica lane 325A, then system 300 corrects the timing of replica lane 325A by making an adjustment to delay element(s) 315A. Also, system 300 makes the same adjustments to the other delay element(s) 315B-N which will affect data lanes 325B-N. In many cases, the drift that has occurred in the phase timing on replica lane 325A will also have occurred on data lanes 325B-N. Accordingly, system 300 is able to correct for the drift in phase timing on all lanes 325A-N by only performing tests on the single replica lane 325A. In one embodiment, system 300 is configured to perform these tests on single replica lane 325A at regular intervals. In another embodiment, system 300 is configured to perform tests on replica lane 325A in response to detecting one or more conditions (e.g., increased error rate, temperature variation, power supply variation).

Figure 4:
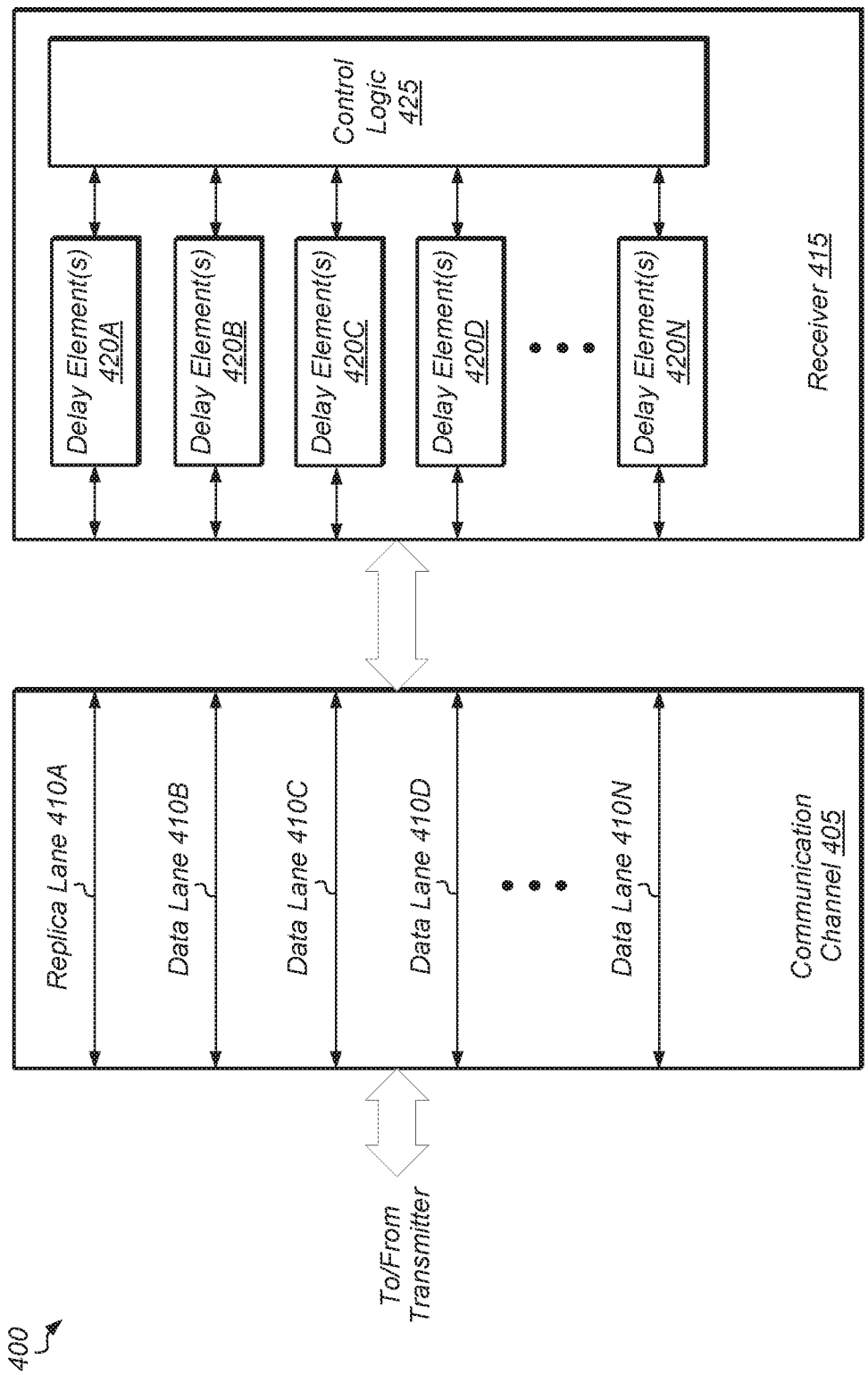
FIG. 4 is a block diagram of one embodiment of a system with a receiver and a communication channel.

Turning now to FIG. 4, a block diagram of one embodiment of a system 400 with a communication channel 405 and a receiver 415 is shown. Similar to system 300 of FIG. 3, system 400 is configured to correct the phase timing of data lanes 410B-N based on detecting a drift in the phase timing of replica lane 410A. However, in contrast to system 300, system 400 makes the corrections in phase timing in receiver 415 using delay element(s) 420A-N. In this embodiment, rather than sending feedback to the transmitter (not shown), control logic 425 of receiver 415 utilizes the feedback on received test patterns to make adjustments to delay element(s) 420A-N.

Figure 5:
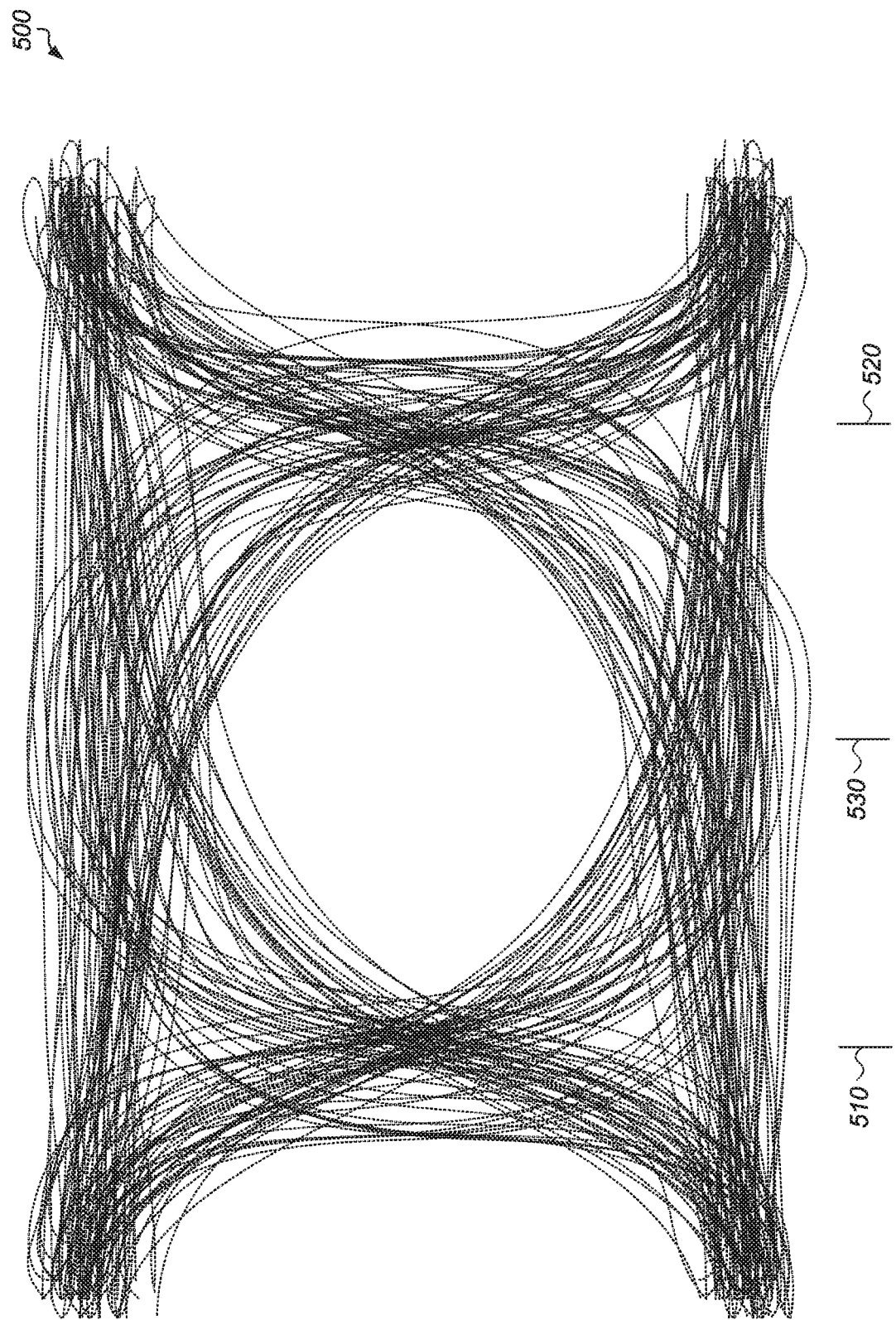
FIG. 5 is a diagram of one embodiment of a data eye.

Referring now to FIG. 5, a diagram of one embodiment of a data eye 500 is shown. Data eye 500 is one example of a data valid period which is monitored by capturing the bit transitions on a lane of a channel (e.g., communication channel 320 of FIG. 3). In one embodiment, a system (e.g., system 300) is configured to perform multiple training sequences at different delay settings to detect the boundaries of the data eye 500. The system is configured to utilize feedback generated by the receiver (e.g., receiver 110 of FIG. 1) regarding the results of each test.

The system runs multiple tests at multiple delay settings, and when the feedback goes from bad (i.e., one or more errors) to good (i.e., no errors), the system recognizes that particular delay setting as coinciding with the opening 510 of data eye 500. The system adds delay in small increments and performs additional tests, and when the feedback goes from good to bad, the system identifies the closing 520 of data eye 500. The system then takes the average of the opening 510 and the closing 520 to calculate the center 530 of data eye 500. The delay settings corresponding to the center 530 of data eye 500 are considered the optimal delay settings for the given lane of the channel. In one embodiment, the system performs these tests on the replica lane of the channel and then utilizes the results of these tests to update the delay settings for the data lanes of the channel.

Figure 6:
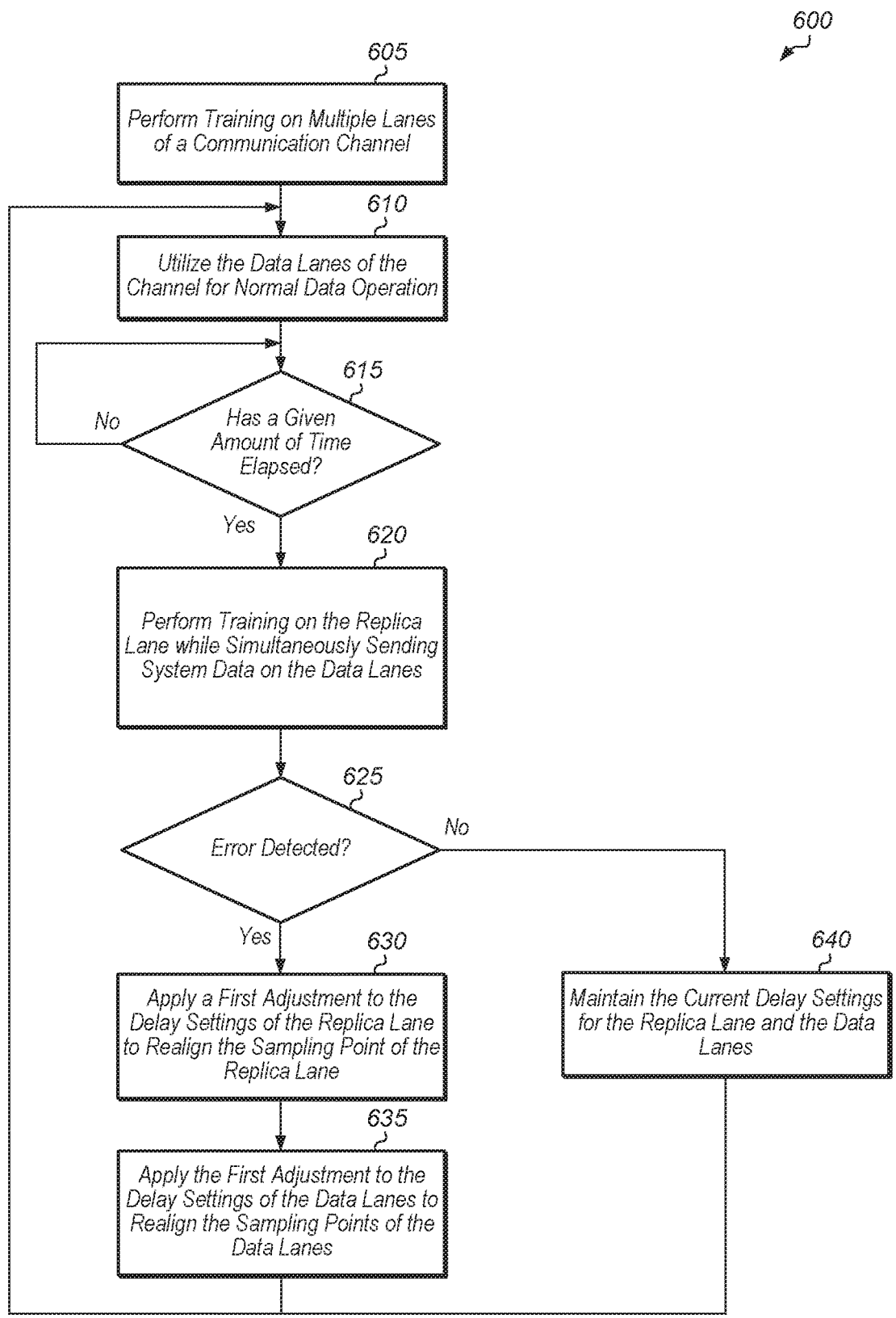
FIG. 6 is a generalized flow diagram illustrating one embodiment of a method for adjusting the phase timing of a multi-lane channel.

Turning now to FIG. 6, one embodiment of a method 600 for adjusting the phase timing of a multi-lane channel is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 600.

A system with a transmitter coupled to a receiver via a multi-lane communication channel implements training sequences on multiple lanes of the channel concurrently (block 605). In one embodiment, the communication channel includes a replica lane and one or more data lanes. As part of implementing training sequences on multiple lanes of the channel, the system updates the delay settings for the lanes to cause each lane to sample the incoming data at the optimal sampling point.

Next, the system may utilize the data lanes for normal data operation (block 610). During normal data operation, the replica lane of the channel is idle. Then, the system determines if a given amount of time has elapsed since the last training sequence was implemented (conditional block 615). For example, the system has a timer which tracks the given amount of time, with the given amount of time being programmable and varying from embodiment to embodiment.

If the given amount of time has elapsed (conditional block 615, "yes" leg), then the system implements one or more training sequences on the replica lane while simultaneously sending system data on the data lanes (block 620). If the given amount of time has not elapsed (conditional block 615, "no" leg), then method 600 remains at conditional block 615. After block 620, the system determines if the training sequences implemented on the replica lane indicate that the optimal sampling point for the replica lane has drifted from the previous test (conditional block 625).

If the optimal sampling point for the replica lane has drifted from the previous test (conditional block 625, "yes" leg), then the system applies a first adjustment to the delay settings of the replica lane to realign the sampling point of the replica lane (block 630). The system also applies the first adjustment to the delay settings of the data lanes of the channel to realign the sampling points of the data lanes (block 635). The system operates under the assumption that any drift in the optimal sampling point on the replica lane will also occur on the data lanes. Accordingly, the system applies the same adjustment to the delay settings of the data lanes that the system applies to the delay settings of the replica lane. For example, if a delay of a first amount was added to the delay settings of the replica lane, then the delay of the first amount is added to the delay settings of the data lanes. If the optimal sampling point for the replica lane has not drifted from the previous test (conditional block 625, "no" leg), then the system maintains the current delay settings of the replica lane and the data lanes (block 640). After blocks 635 and 640, method 600 returns to block 610 with the system continuing to utilize the data lanes for normal data operation.

Figure 7:
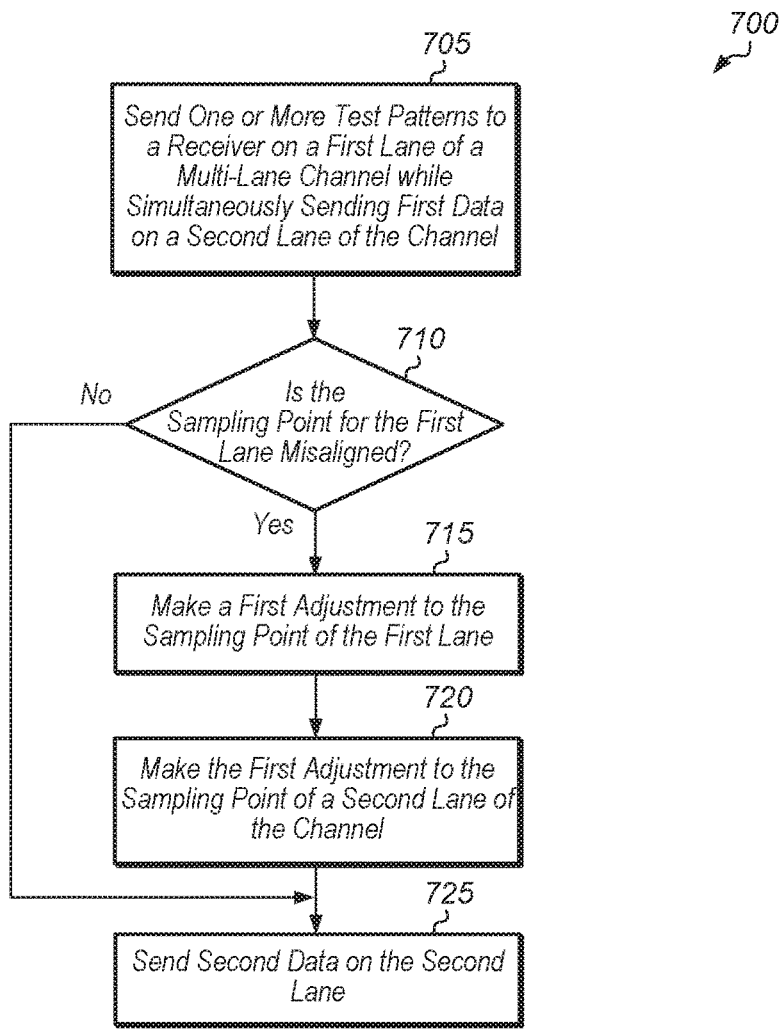
FIG. 7 is a generalized flow diagram illustrating another embodiment of a method for utilizing a replica lane to adjust sampling points on other lanes of a channel.

Referring now to FIG. 7, one embodiment of a method 700 for utilizing a replica lane to adjust sampling points on other lanes of a channel is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 700.

A transmitter sends one or more test patterns to a receiver on a first lane of a multi-lane channel while simultaneously sending first data on a second lane of the channel (block 705). The transmitter and receiver are components within a host system. The first lane may also be referred to as a "replica lane". The one or more test patterns are sent to the receiver on the first lane as part of training sequences to test delay settings on the first lane between the transmitter and the receiver. These training sequences are used to determine the location of the data eye for the first lane and to determine if the data eye (and the corresponding optimal sampling point) has shifted from a previous test.

Next, the system determines if a current sampling point for the first lane is misaligned based on the results of the test patterns received by the receiver (conditional block 710). For example, the system runs multiple tests on the first lane at multiple delay settings, and when the received test patterns go from having one or more errors to having no errors, the system recognizes that particular delay setting as coinciding with the opening of the data eye. The system adds delay in small increments and performs additional tests, and when the received test patterns go from having no errors to having one or more errors, the system identifies the closing of the data eye. The system takes the average of the opening and the closing of the data eye to calculate the center (or optimal sampling point) of the data eye. The system then determines if this new optimal sampling point matches the first lane's actual sampling point. In other embodiments, the system utilizes other suitable techniques for determining if the optimal sampling point has drifted for the first lane.

If the system determines that the current sampling point for the first lane is misaligned based on the results of the test patterns received by the receiver (conditional block 710, "yes" leg), then the system makes a first adjustment to the sampling point of the first lane to bring the sampling point back into alignment with the optimal sampling point (block 715). Also, the system makes the first adjustment to the sampling point of a second lane of the channel (block 720). The system also makes the first adjustment to the sampling points of one or more other lanes of the channel. For example, in one embodiment, the system makes the first adjustment to the sampling points of all of the data lanes of the channel. If the system determines the sampling point for the first lane is aligned properly based on the results of the test patterns received by the receiver (conditional block 710, "no" leg), then the transmitter sends second data on the second lane (block 725).

Variations in the signal delay occur for the first lane and the other lanes in a similar fashion due to temperature variation, power supply variation, and/or other factors. Accordingly, detecting a change in the optimal sampling point for the first lane typically indicates that the other lanes have experienced a similar drift in the data eye and that a change to correct the first lane is also the same change that is needed to correct the other lanes of the channel. Therefore, the first adjustment made for the second lane (and for any other lanes) of the channel is the same as the first adjustment made to the first lane. For example, if the first adjustment is an increase in the delay added to the first lane by one fourth of a clock cycle, then the delay is increased for the other lanes by one fourth of a clock cycle. Alternatively, if the first adjustment is a decrease in the delay added to the first lane, with the decrease equal to one eighth of a clock cycle, then the delay is decreased for the other lanes by one eighth of a clock cycle. In other embodiments, other delay increments are added or removed from lanes in an equivalent manner to the adjustment made to the first lane. In one embodiment, the adjustments to the sampling point are made by the transmitter. In another embodiment, the adjustments to the sampling point are made by the receiver.

After block 720, the transmitter sends second data on the second lane (block 725). The transmitter also sends additional data on one or more other lanes of the channel after making adjustments to the sampling points used for other lanes. After block 725, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a receiver; and
   a transmitter, coupled to the receiver via a communication channel having a plurality of lanes including at least a first lane and a second lane, wherein the first lane is not utilized for carrying system data;
   wherein the transmitter is configured to:
      send a test pattern on the first lane of the channel;
      send first data on the second lane of the channel while simultaneously sending the test pattern on the first lane;
   wherein the receiver is configured to:
      receive the test pattern via the first lane of the first channel;
      determine that a sampling point of the first lane is misaligned based on detecting one or more errors in the test pattern;
      in response to detecting the one or more errors:
         perform a first adjustment to a sampling point of the first lane;
         perform a second adjustment to a sampling point of the second lane of the channel, wherein the second adjustment is a same adjustment as the first adjustment, wherein the first adjustment to the sampling point of the second lane is made to a delay setting corresponding to the second lane without sending a test pattern on the second lane and is based on a detected drift in phase timing of the first lane.

2. The system as recited in claim 1, wherein the system is further configured to send second data on the second lane while the first lane is idle, subsequent to performing the first adjustment to the sampling point of the second lane.

3. The system as recited in claim 1, wherein the receiver is configured to change a delay setting that updates a location of a data eye on each of the first lane and the second lane to cause the first adjustment and the second adjustment.

4. The system as recited in claim 1, wherein the receiver is configured to receive the test pattern on the first lane while simultaneously receiving the first data on the second lane.

5. The system as recited in claim 4, wherein responsive to receiving the error indication on the first lane, the receiver is configured to change a delay setting for the first lane to cause the first adjustment to the sampling point of the first lane if the error indication indicates an error was detected.

6. The system as recited in claim 4, wherein responsive to receiving the error indication on the first lane, the receiver is configured to change a delay setting for the second lane to cause the first adjustment to the sampling point of the second lane if the error indication indicates an error was detected, wherein the first adjustment to the sampling point of the second lane is equivalent to the first adjustment to the sampling point of the first lane.

7. An apparatus comprising:
   a receiver;
   a transmitter; and
   a communication channel comprising a plurality of lanes including at least a replica lane and at least one data lane, wherein the replica lane is not utilized for carrying system data;
   wherein the transmitter is configured to:
      send a test pattern on the replica lane;
      send first data on the data lane of the channel while simultaneously sending the test pattern on the replica lane;
   wherein the receiver is configured to:
      receive the test pattern via the replica lane of the first channel;
      determine that a sampling point of the replica lane is misaligned based on detecting one or more errors in the test pattern;
      in response to detecting the one or more errors:

perform a first adjustment to a sampling point of the replica lane;

perform a second adjustment to a sampling point of the second lane of the channel, wherein the second adjustment is a same adjustment as the first adjustment, wherein the first adjustment to the sampling point of the data lane is made to a delay setting corresponding to the data lane without sending a test pattern on the data lane and is based on a detected drift in phase timing of the replica lane.

8. The apparatus as recited in claim 7, wherein the apparatus is configured to send second data on the data lane while the replica lane is idle, subsequent to performing the first adjustment to the sampling point of the data lane.

9. The apparatus as recited in claim 7, wherein the receiver is configured to change a delay setting that updates a location of a data eye on each of the first lane and the second lane to cause the first adjustment and the second adjustment.

10. The apparatus as recited in claim 7, wherein the receiver is configured to receive the test pattern on the replica lane while simultaneously receiving the first data on the data lane.

11. The apparatus as recited in claim 10, wherein responsive to receiving the error indication on the replica lane, the receiver is further configured to change a delay setting for the replica lane to cause the first adjustment to the sampling point of the replica lane if the error indication indicates an error was detected.

12. The apparatus as recited in claim 10, wherein responsive to receiving the error indication on the replica lane, the receiver is further configured to change a delay setting for the data lane to cause the first adjustment to the sampling point of the data lane if the error indication indicates an error was detected, wherein the first adjustment to the sampling point of the data lane is equivalent to the first adjustment to the sampling point of the replica lane.

13. A method comprising:

sending, by a transmitter, a test pattern on a first lane of a communication channel having a plurality of lanes including at least the first lane and a second lane, wherein the first lane is not utilized for carrying system data;

sending, by the transmitter, first data on the second lane of the channel while simultaneously sending the test pattern on the first lane;

receiving, by a receiver, the test pattern via the first lane of the first channel;

determining that a sampling point of the first lane is misaligned based on a number of errors detected in the test pattern received by a receiver based on detecting one or more errors in the test pattern;

in response to detecting the one or more errors:

performing a first adjustment to a sampling point of the first lane;

performing a second adjustment to a sampling point of the second lane of the channel, wherein the second adjustment is a same adjustment as the first adjustment, wherein the first adjustment to the sampling point of the second lane is made to a delay setting corresponding to the second lane without sending a test pattern on the second lane and is based on a detected drift in phase timing of the first lane.

14. The method as recited in claim 13, further comprising sending second data on the second lane while the first lane is idle, subsequent to performing the first adjustment to the sampling point of the second lane.

15. The method as recited in claim 13, further comprising changing, by the receiver, a delay setting that updates a location of a data eye on each of the first lane and the second lane to cause the first adjustment and the second adjustment.

16. The method as recited in claim 13, further comprising:

receiving the test pattern on the first lane while simultaneously receiving the first data on the second lane.

17. The method as recited in claim 16, wherein responsive to receiving the error indication on the first lane, the method further comprising changing, by the receiver, a delay setting for the first lane to cause the first adjustment to the sampling point of the first lane if the error indication indicates an error was detected.

18. The method as recited in claim 16, wherein responsive to receiving the error indication on the first lane, the method further comprising changing, by the receiver, a delay setting for the second lane to cause the first adjustment to the sampling point of the second lane if the error indication indicates an error was detected, wherein the first adjustment to the sampling point of the second lane is equivalent to the first adjustment to the sampling point of the first lane.

* * * * *